(12) United States Patent
Schenk

(10) Patent No.: US 8,068,547 B2
(45) Date of Patent: Nov. 29, 2011

(54) DATA COMMUNICATION

(75) Inventor: Heinrich Schenk, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 775 days.

(21) Appl. No.: 12/117,755

(22) Filed: May 9, 2008

(65) Prior Publication Data

US 2009/0279620 A1 Nov. 12, 2009

(51) Int. Cl.
*H04L 27/26* (2006.01)
(52) U.S. Cl. .......... 375/260; 375/259; 375/261
(58) Field of Classification Search .......... 375/259, 375/260, 261
See application file for complete search history.

(56) References Cited

U.S. PATENT DOCUMENTS

| 7,177,350 B1 | 2/2007 | Long et al. |
| 2003/0067992 A1* | 4/2003 | Karaoguz et al. ............ 375/265 |
| 2008/0292010 A1* | 11/2008 | Wernears ............ 375/260 |

FOREIGN PATENT DOCUMENTS

| DE | 10242637 B4 | 3/2004 |
| EP | 1876782 A1 | 1/2008 |
| WO | WO 01/08369 A1 | 2/2001 |

OTHER PUBLICATIONS

Asymmetric digital subscriber line transceivers 2 (ADSL2), ITU-T Telecommunication Standardization Sector of ITU, G.992.3, Jan. 2005, pp. 203-433.
Keller, T.; Hanzo, L.: Blind-detection assisted sub-band adaptive turbo-coded OFOM schemes, IN: Vehicular Technology Conference, 1999 IEEE 49th ,vol. 1, Publication Year: 1999 , pp. 489-493 vol. 1.

* cited by examiner

*Primary Examiner* — Shuwang Liu
*Assistant Examiner* — Michael Neff
(74) *Attorney, Agent, or Firm* — SpryIP, LLC

(57) ABSTRACT

Embodiments related to communication of data in a first and second transmission mode are depicted and described herein.

19 Claims, 16 Drawing Sheets

4 ⇔ 7 bit

| | |
|---|---|
| 0000 | 0000000 |
| 0001 | 0000001 |
| 0010 | 0000010 |
| 0011 | 0000011 |
| 0100 | 0010100 |
| 0101 | 0010101 |
| 0110 | 0010110 |
| 0111 | 0010111 |
| 1000 | 0101000 |
| 1001 | 0101001 |
| 1010 | 0101010 |
| 1011 | 0101011 |
| 1100 | 0111100 |
| 1101 | 0111101 |
| 1110 | 0111110 |
| 1111 | 0111111 |

2 ⇔ 6 bit

| | |
|---|---|
| 00 | 000000 |
| 01 | 010101 |
| 10 | 101010 |
| 11 | 111111 |

= Initialization

= First data transmission mode

= Second transmission mode

DATA COMMUNICATION

BACKGROUND

In many data communication systems data are transmitted by modulating digital data onto transmission signals. Such data transmission systems include single-carrier data communication systems such as QAM (Quadrature amplitude modulation) or PSK (Phase shift keying) and multi-carrier system using a plurality of subcarriers such as OFDM (Orthogonal frequency division multiplexing) or DMT (Discrete multitone modulation) to transmit data on multiple frequency bands.

SUMMARY

According to a first aspect, a method of communicating data comprises providing a constellation, the constellation assigning a set of bit sequences to a set of constellation points. Data are transferred in a first transmission mode, the transferring data in the first transmission mode comprising providing transmission symbols by mapping data bits to constellation points of the set of constellation points in accordance with the constellation and modulating a transmission signal based on the transmission symbols. Data are transferred in a second transmission mode, the transferring data in the second transmission mode comprising providing the transmission symbols by mapping data bits only to a subset of the set of constellation points in accordance with the constellation and modulating a transmission signal based on the transmission symbols.

Furthermore, according to a further aspect, a device comprises a data input to provide segments of data bits to be transmitted. The device comprises a constellation mapper mapping a set of bit sequences to a set of constellation points in accordance with a constellation. The device is configured to map in a first transmission mode the segments of the data bits to the set of constellation points in accordance with the constellation and to map in a second transmission mode the segments of data bits only to constellation points of a subset of the set of constellation points in accordance with the constellation.

Furthermore, according to a further aspect, a device comprises an input to receive for each subcarrier of first subcarriers a symbol transmitted from a remote device and a constellation demapper to map for each first subcarrier the transmitted symbol to first bit segments based on a constellation provided for each first subcarrier, each constellation comprising a set of constellation points. The device further comprises an entity to provide for each first subcarrier information whether the symbol transmitted on this subcarrier represents a constellation point within a subset of the respective set of constellation points for the respective subcarrier. The device is configured to determine a change from a first transmission mode to a second transmission mode based on the information.

Furthermore, according to a further aspect, a system comprises a first device, the first device comprising an input to provide segments of data bits, a constellation mapper, the constellation mapper mapping a set of bit sequences to a set of constellation points in accordance with a constellation. The first device is configured to map in a first transmission mode segments of the data bits in accordance with the constellation to constellation points and to modulate a transmission signal based on the one or more constellation points. The first device is further configured to map in a second transmission mode segments of data bits only to constellation points of a subset of the set of constellation points and to modulate the transmission signal based on the one or more constellation points of the subset. The system comprises a second device, the second device comprising an input to receive a symbol transmitted from the first device, a constellation demapper to map the transmitted symbol to first bit segments based on the constellation and an entity to provide information whether the symbol transmitted is within the subset of constellation points. The second device is configured to determine the change from the first transmission mode to the second transmission mode based on the information.

BRIEF DESCRIPTION OF THE SEVERAL VIEWS OF THE DRAWINGS

FIGS. 6a and 6b show a bit mapping diagrams according to embodiment;

DETAILED DESCRIPTION

The following detailed description explains exemplary embodiments. The description is not to be taken in a limiting sense, but is made only for the purpose of illustrating the general principles of embodiments while the scope of protection is only determined by the appended claims.

In the various figures, identical or similar entities, modules, devices etc. may have assigned the same reference number.

Figure 1:
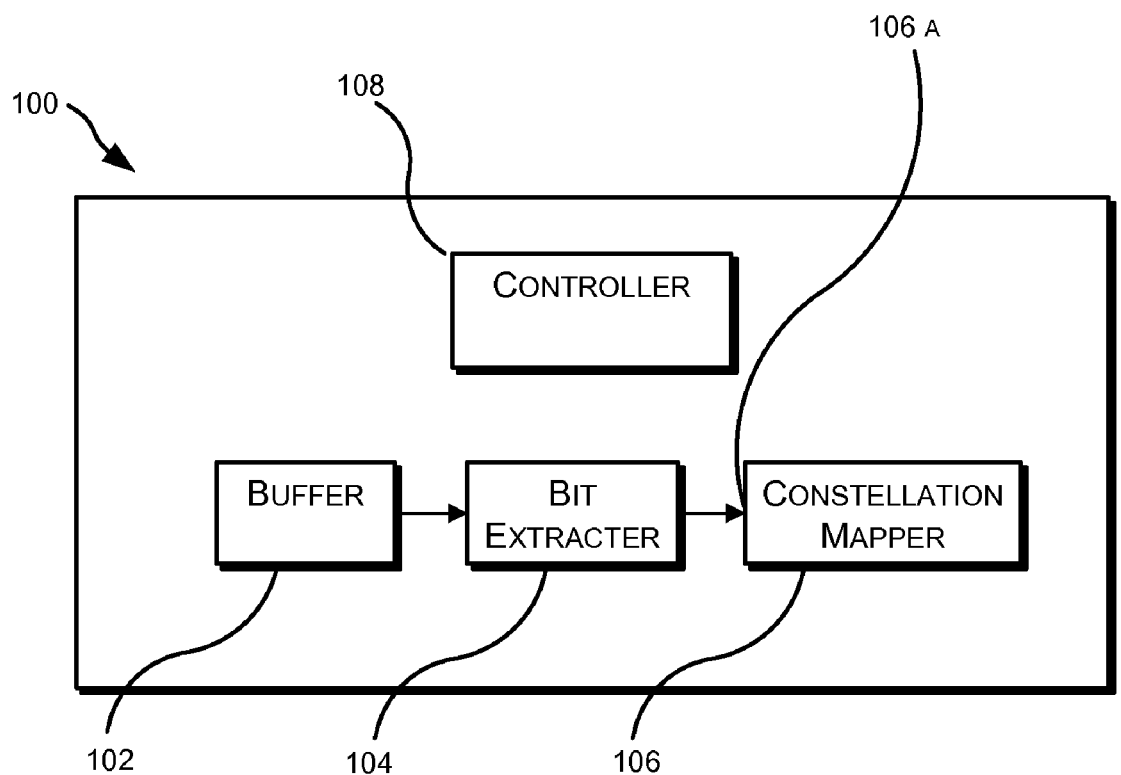
FIG. 1 shows a block diagram according to an embodiment.

Referring now to FIG. 1, an exemplary embodiment comprises a device 100 which may for example implement a transmitter of a data communication system. The device 100 comprises a data buffer 102 to provide data bits to be transmitted by the device 100. A bit extracter 104 is coupled to the data buffer 102 to extract segments of data bits from the data buffer. An output of the bit extracter 104 is coupled to a data input 106a of a constellation mapper 106. The constellation mapper 106 implements mapping of the data segments received at an input of constellation mapper 106 to transmission symbols in accordance with a constellation. A constellation can be regarded as a map or a diagram assigning a set of predefined bit sequences to a set of constellation points. The constellation mapper 106 maps each bit segment received at an input of the constellation mapper 106 to a symbol in accordance with the constellation and outputs the symbol. A transmission signal may then be generated based on the symbols output by the constellation mapper. The symbols output by the constellation mapper are generated by determining the bit sequence of the received bit segment and looking up which constellation point is assigned to the determined bit sequence. The constellation mapper may according to embodiments include constellation mappers for single carrier modulation such as QAM, PAM, PSK. In other embodiments, constellation mapper may be implemented for multi-carrier modulation such as OFDM or DMT. As will be described below in more detail, in multi-carrier modulation a constellation is provided for each subcarrier. For example, in OFDM and DMT, a QAM constellation is provided for each subcarrier allowing to modulate received bit segments onto respective frequencies according to the QAM constellation provided for the respective subcarrier. These multi-carrier systems can therefore be regarded as a multi-QAM system. According to embodiments, the communication system may be a wired communication system such as a DSL system for example a ADSL (asymmetric digital subscriber line) or a VDSL (very high digital subscriber line). The DSL system may for example implement a vectored transmission on multiple channels such as provided in VDSL 2. The communication system is however not restricted to wired communication and other embodiments may implement a wireless communication.

Figure 2A:
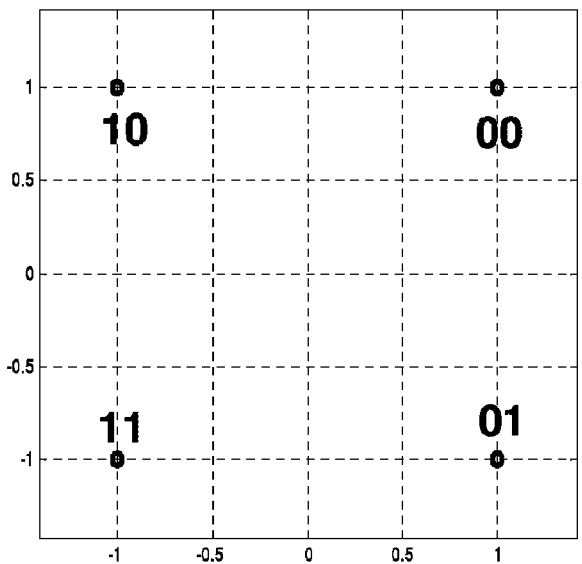
FIGS. 2a and 2b show QAM constellations.
Figure 2B:
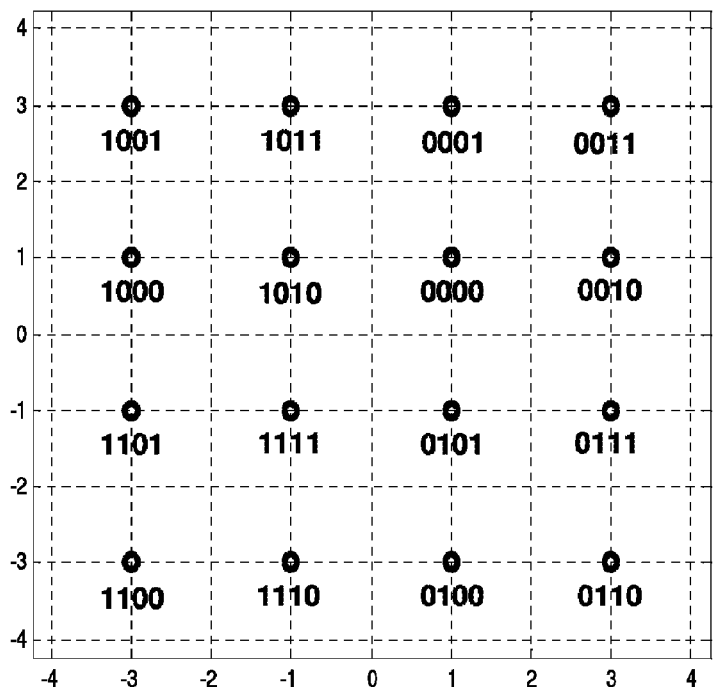

FIGS. 2a and 2b show exemplary embodiments of a 4 QAM and 16 QAM constellation. As can be seen, 4 QAM has 4 constellation points. A set of bit sequences having a length of two bits, i.e. the bit sequences 11, 10, 01 and 00, to respective constellation points in the complex plane. 16 QAM has 16 constellation points and assigns a set of bit sequences having a length of 4 bits to respective constellation points. Each complex constellation point therefore corresponds to one bit sequence of the set of bit sequences. Constellation points are sometimes referred to as constellation vectors or constellation symbols. The data bits are provided in the form of bit segments of n bits to the constellation mapper. The QAM constellation mapper may assign each of the bit segments a complex symbol having a value of $$c(k)=a(k)+j \cdot b(k)$$

where k is an time index. The imaginary part of this complex symbol is according to embodiments associated with a sine of a carrier signal and the real part of the complex symbol is associated with a cosine of the carrier signal. In a modulator (not shown in FIG. 1), the sine and cosine of the carrier signal is modulated dependent on the real and imaginary part of the symbol and the sine and the modulated sine and cosine signals are added to form a data transmission signal. The number of bits which can be transmitted during a symbol time interval is defined by the granularity of the QAM constellation, i.e. the number of constellation points of the constellation. Typically, the number of constellation points equals $2^n$, where n corresponds to the length of the bit sequence of the constellation, i.e. the number of bits that can be transmitted within one symbol.

In the embodiment of FIG. 1, a controller 108 is provided to allow operation of the device in at least two transmission modes. In a first transmission mode, the device 100 is configured by controller 108 to map the data to be transmitted to all constellation points of the set of constellation points in order to provide the symbols. In a second transmission mode, the device is configured by controller 108 to map the data bits to be transmitted only to a subset of the set of constellation points.

Figure 3:
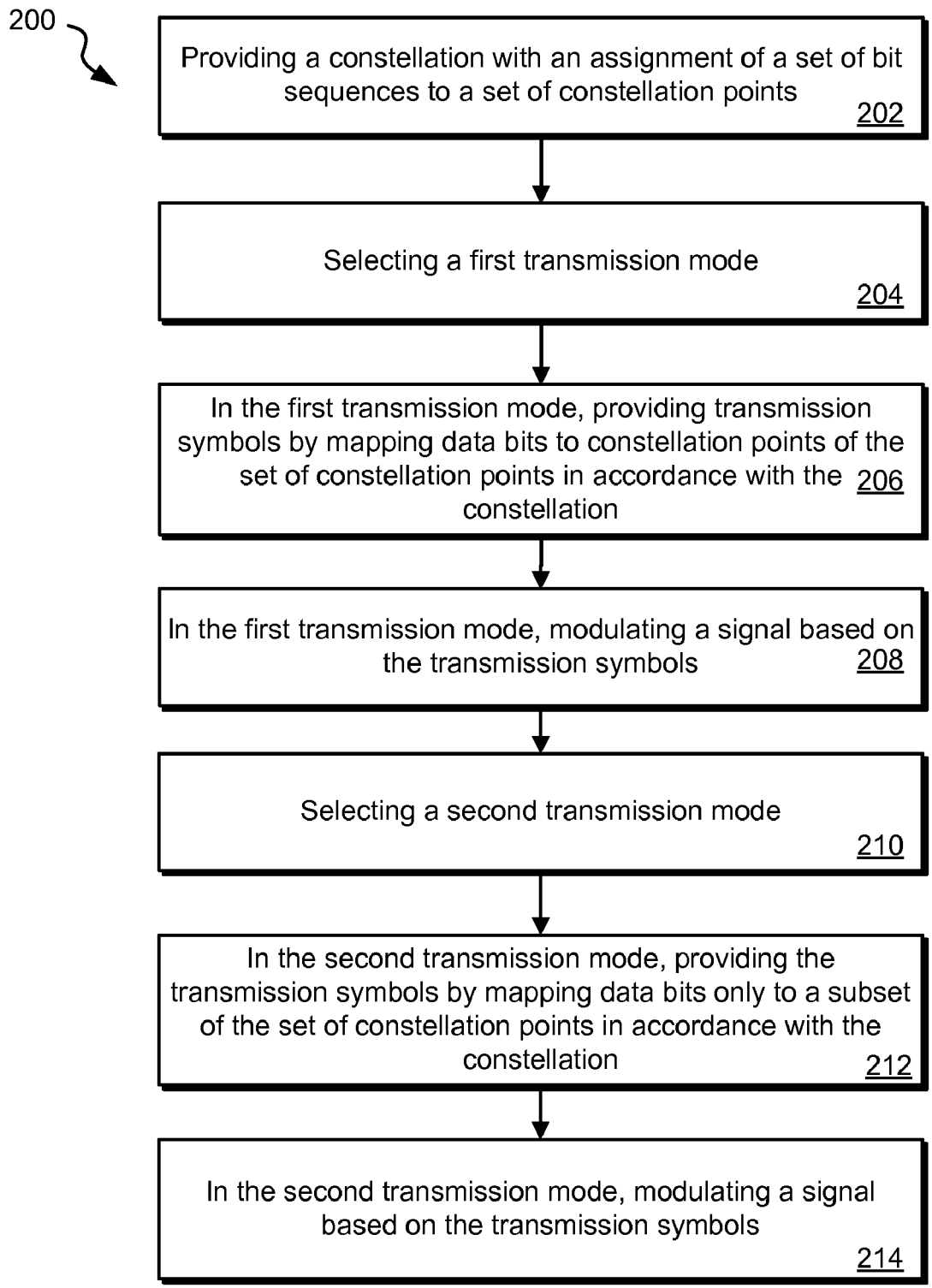
FIG. 3 shows a flow chart diagram according to an embodiment.

Referring now to FIG. 3, a method 200 of a data communication according to an embodiment will be described. The method 200 may be implemented for example in the device 100 for transferring data to a remote device.

In 202, a constellation is provided. The constellation provides an assignment of a set of bit sequences to a set of constellation points as described above. In 204, a selection is made to transfer data in the first transmission mode. Referring to 206, in the first transmission mode, symbols are provided by mapping data bits to the constellation points of the set of constellation points in accordance with the constellation. In 208, a signal is modulated based on the symbols provided in 206. In 210, a selection is made to transfer data in a second transmission mode. Then, in 212, symbols are provided by mapping data bits only to a subset of the set of constellation points in accordance with the constellation. In 214, a signal is modulated based on the symbols provided in 212.

In the device shown in FIG. 1 and the method shown in FIG. 3, since the data bits to be transmitted are only mapped to a subset, constellation points of the constellation which are used in the first transmission mode are not used in the second transmission mode. The constellation however is maintained in the second transmission mode the same as in the first transmission mode and is not reconfigured.

This may be achieved by providing to the input of constellation mapper only data segments having a bit sequence representing constellation points of the subset. An encoding or mapping may be provided prior to the constellation mapper to map first segments of data bits to second segments of data bits such that the second segments of data bits contain only bit sequences of the subset. The subset may according to an embodiment contain $2^{(n-nred)}$ constellation points of a set of $2^n$ constellation points. Then in the first transmission mode which uses all of the $2^n$ constellation points n bits can be transmitted per symbol time wherein in the second transmission mode only n-nred bits can be transmitted during one symbol time interval.

Figure 4A:
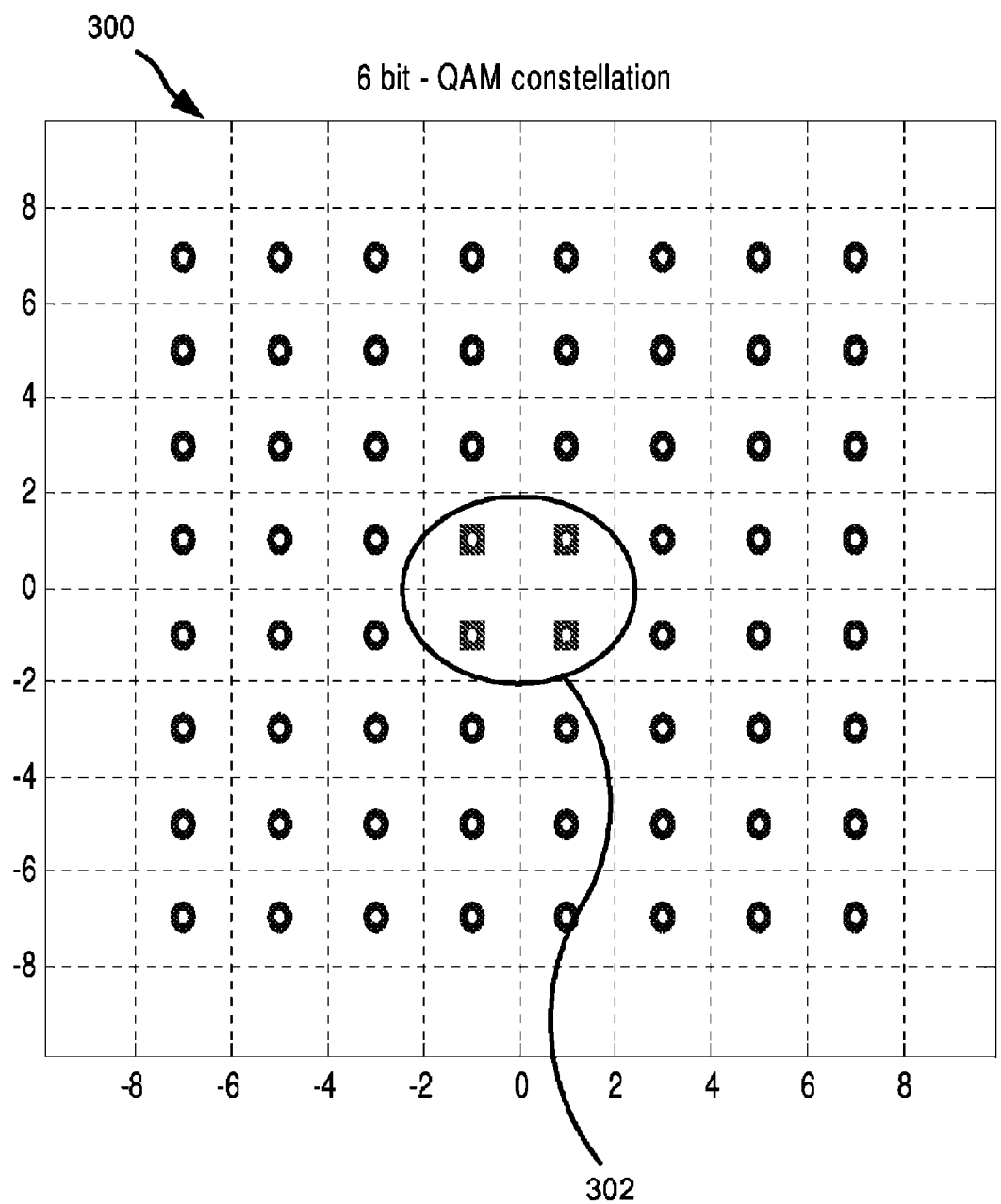
FIGS. 4a and 4b show constellations according to an embodiment.
Figure 4B:
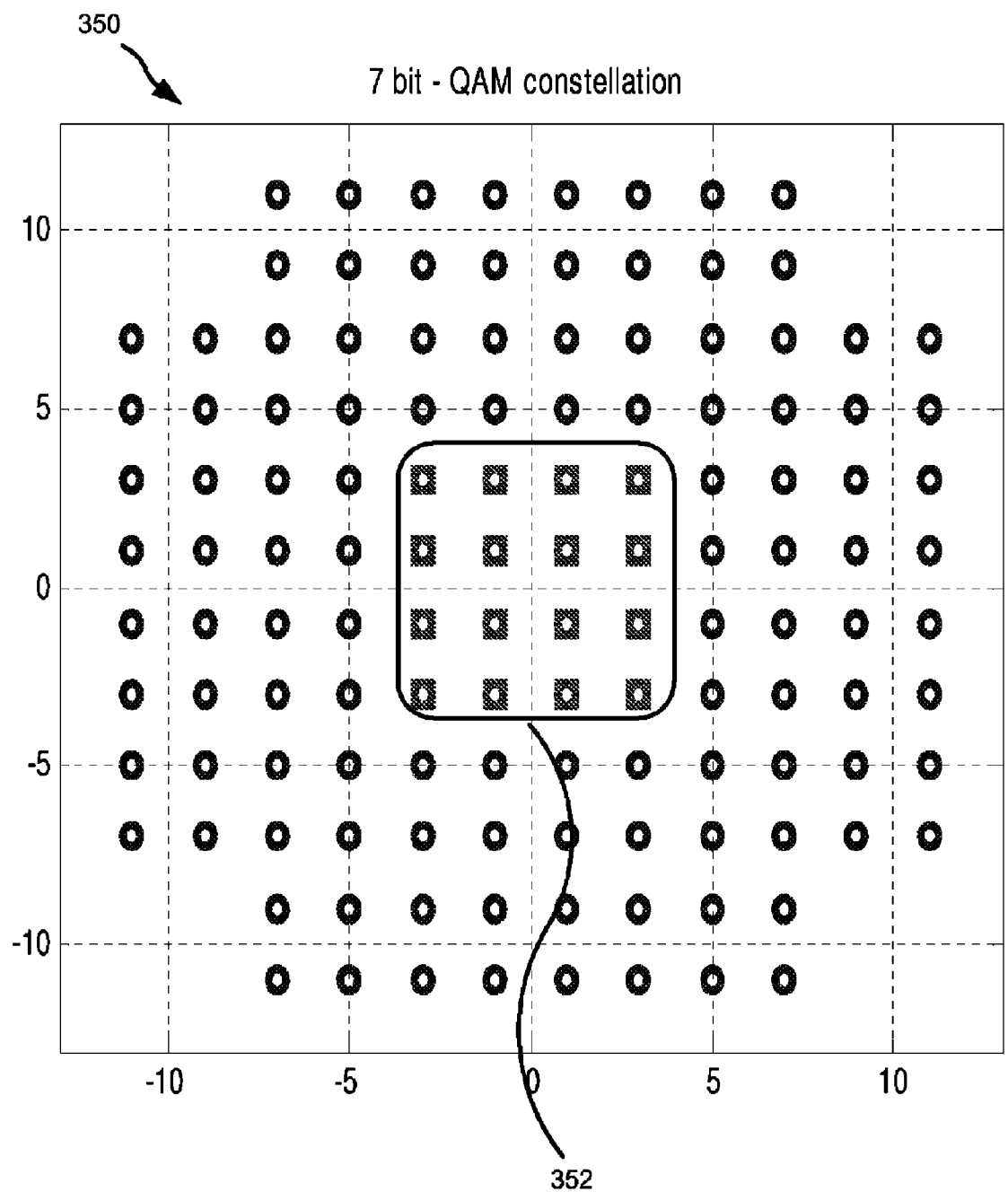

According to embodiments, the second transmission mode may be an energy saving mode. The $2^{(n-nred)}$ configuration points of the subset are selected such that the average signal power in the second transmission mode is reduced compared to the first transmission mode. For example, according to one embodiment, only the constellation points of the set of constellation points which are closest to the origin (0,0) of the complex plane are selected. FIGS. 4a and 4b show exemplary embodiments illustrating the energy saving by using the subset for QAM constellations.

FIG. 4a shows an exemplary embodiment of a 64 QAM constellation 300. The constellation 300 has 64 constellation points allowing to transmit 6 bits per symbol time interval in the first transmission mode. In this embodiment, a subset 302 used in the second transmission mode is provided to contain the 4 constellation points nearest to the origin as shown in FIG. 4a. In this embodiment, the second transmission mode is an energy saving mode. Using only the constellation points of the subset 302 results in a reduction of the data rate to 2 bits per symbol time interval and a reduction of the average power by 13.22 dB.

FIG. 4b shows another exemplary embodiment of a 128 QAM constellation 350. The constellation 350 has a set of 128 constellation points allowing to transmit 7 bits per symbol time interval in the first transmission mode. In this embodiment, a subset 352 used in the second transmission mode is provided to contain the 16 constellation points nearest to the origin as shown in FIG. 4b. Similar to the embodiment of FIG. 4a, the second transmission mode is an energy saving mode wherein by using only the constellation points of the subset in the second transmission mode a reduction of the average power by 9.13 dB is achieved while the data transmission is reduced to 4 bits per symbol time interval.

Figure 5A:
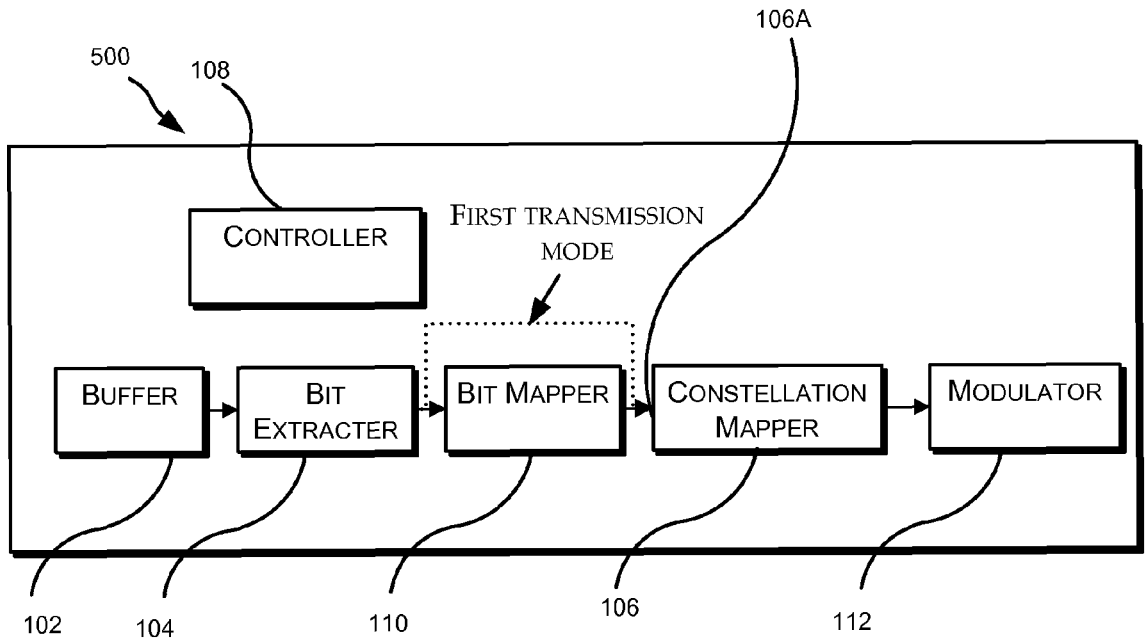
FIGS. 5a and 5b show block diagrams according to embodiments.

FIG. 5a shows an embodiment implementing a mapping of the bit segments prior to the constellation mapper. A device 500 comprises the data buffer 102 and the bit extracter 104 already described with respect to FIG. 1. Between the bit extracter 104 and the constellation mapper 106, an encoder or bit mapper 110 is operable to provide a bit mapping of first bit segments received from the bit extracter to second bit segments which are output to the constellation mapper 106. FIG. 5a further shows a modulator 112 modulating the symbols output by the constellation mapper 106 onto a transmission signal which is transmitted to a remote device. Device 500 is controlled by controller 108 to transfer in the first transmission mode the bit segments output by the bit extracter 104 to the data input 106a of the constellation mapper 106. This may be achieved by bypassing the bit mapper 110 in the first transmission mode or by decoupling the bit mapper 110 in the first transmission mode. In other embodiments, the bit mapper 110 may provide in the first transmission mode an identity mapping wherein the bit segments received at the input identical to the output. In the second transmission mode, the bit mapper 110 provides a mapping of the first bit segments, i.e. the bit segments received from the bit extracter 104 to second bit segments, i.e. the segments output by the bit mapper. In the mapping scheme of the bit mapper the first bit segments have a length smaller than a length of the second bit segments. Since the length of the first bit segments is smaller than a length of the second bit segments, a mapping of the data bits to be transferred only to the bit sequences of the subgroup of constellation points can be achieved. In other words, the mapping provided by bit mapper 110 allows to map the data bits to be transferred to bit segments containing only the bit sequences corresponding to constellation points of the subgroup of constellation points.

However, the same constellation, i.e. same size and same mapping scheme as in the first transmission mode is used in the second transmission mode. By providing in the second transmission mode to the data input 106a of the constellation mapper only data segments containing bit sequences of the subgroup, the constellation mapper maps the data bits to be transmitted to the constellation points of the subgroup without providing a new constellation, i.e. the constellation is maintained the same in the first and second transmission mode. Furthermore, according to embodiments, operating parameters related to the constellation, for example a scaling factor of the constellation is maintained when switching from the first transmission mode to the second transmission mode.

FIGS. 6a and 6b show a bit mapping scheme provided for the embodiments shown in FIGS. 4a and 4b. FIG. 6a shows the mapping scheme (coding scheme) for the embodiment shown in FIG. 4a wherein a reduction from 6 to 2 bit is provided when using the subgroup for mapping in the second transmission mode. As can be seen, the full set of bit sequences having 2 bits, i.e. 00, 01, 10 and 11 is mapped to second 6-bit segments containing the bit sequences of the constellation points of the subgroup shown in FIG. 4a, i.e. 000000, 01010101, 1010101 and 111111. It is to be noted that for this mapping, the coding can be provided in an easy way by simply repeating 3 times the sequence of the first bits.

FIG. 6b shows the mapping scheme (coding scheme) for the embodiment shown in FIG. 4b wherein a reduction from 7 to 4 bit is provided when using the subgroup for mapping in the second transmission mode. As can be seen, the full set of bit sequences having 4 bits is mapped to 7-bit segments containing the bit sequences of the constellation points of the subgroup shown in FIG. 4b.

Figure 5B:
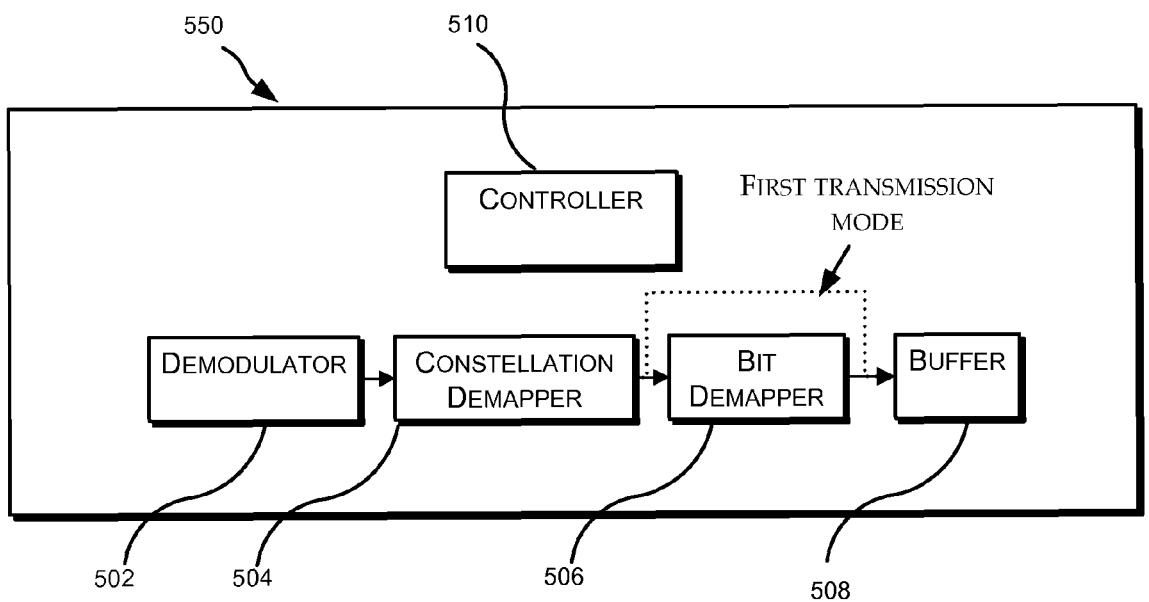

FIG. 5b shows an implementation according to an embodiment at the receiver side. A device 550 comprises a demodulator 502 to receive the transmitted signal. The demodulator provides at an output the respective symbols transmitted in the receive signal. The demodulator 502 is coupled to a constellation demapper 504 mapping the received symbols in accordance with the constellation to bit segments having the bit sequences of the constellation point matching the received symbols. A controller 510 controls the device 550 such that in the first transmission mode the bit segments are provided to a buffer 508 for allowing the reassembling of the data segments. In the second transmission mode, the transferred symbols correspond only to constellation points of the subgroup. The controller 510 controls the device 550 such that in the second transmission mode the bit segments output by the constellation demapper 504 are transferred to a bit demapper 506. Bit demapper 506 implements the inverse of the mapping scheme of bit mapper 110 of the device 500 shown in FIG. 5a. In other words, bit demapper 506 maps first segments received at an input of bit demapper 506 from an output of constellation demapper 504 to second segments wherein the first segments have a length which is greater than a length of the second segments. The demapped or decoded bits, i.e. the second bit segments are then provided to the buffer 508 coupled to demapper 504 in the second transmission mode for allowing reassembling.

While in the embodiments of FIGS. 4a and 4b a subgroup is selected for providing energy saving during the second transmission mode by selecting the constellation points closest to the origin, other embodiments may use other subsets of the set of constellation points. For example, according to one embodiment, a subset used in the second transmission mode may be selected to provide in the second transmission mode a robust data transmission. Here, the constellation points of the subset may be selected to obtain an increased distance in the constellation between the constellation points resulting in an increase of the signal to noise ration and therefore a more robust transmission.

Furthermore, in other embodiments, more than two transmission modes may be provided. For each additional transmission mode a further subset may be provided. The subsets of these transmission modes may be disjunct, i.e. a constellation point can not be in more than one subset. In other embodiments, the subsets may have small overlap, allowing for example one constellation point to be in more than one constellation.

By using the respective constellation subgroups, the character of the transmission can be changed. For example, one subgroup may be a subgroup providing energy savings as described above and a further subgroup may be a subgroup providing robust transmission. By switching between the full set of constellation points and the two subgroups, the data transmission can be seamlessly adapted according to the momentary needs of the system. For example, if the need is to provide a high data rate, the system can use the full set of constellation points, if the need is for a robust transmission with the avoidance of retransmission of data to the user, for example because of QOS requirements (Quality of service requirements), the system can use the subset provided for robust data transmission and if there is no momentary need for a high data rate or robust transmission, the system can use the subset provided for energy savings resulting in a saving of electrical power.

As will be described in more detail below, according to embodiments the switching between the transmission modes can be achieved in a seamless manner without the need for transferring any additional information to a receiver. This allows in embodiments to avoid the use of a extended standardized protocol such as the protocol provided in ADSL 2 to transfer to a L2 low power mode resulting in a fast change of the data transmission mode which may be in embodiments within a few msec.

Figure 7:
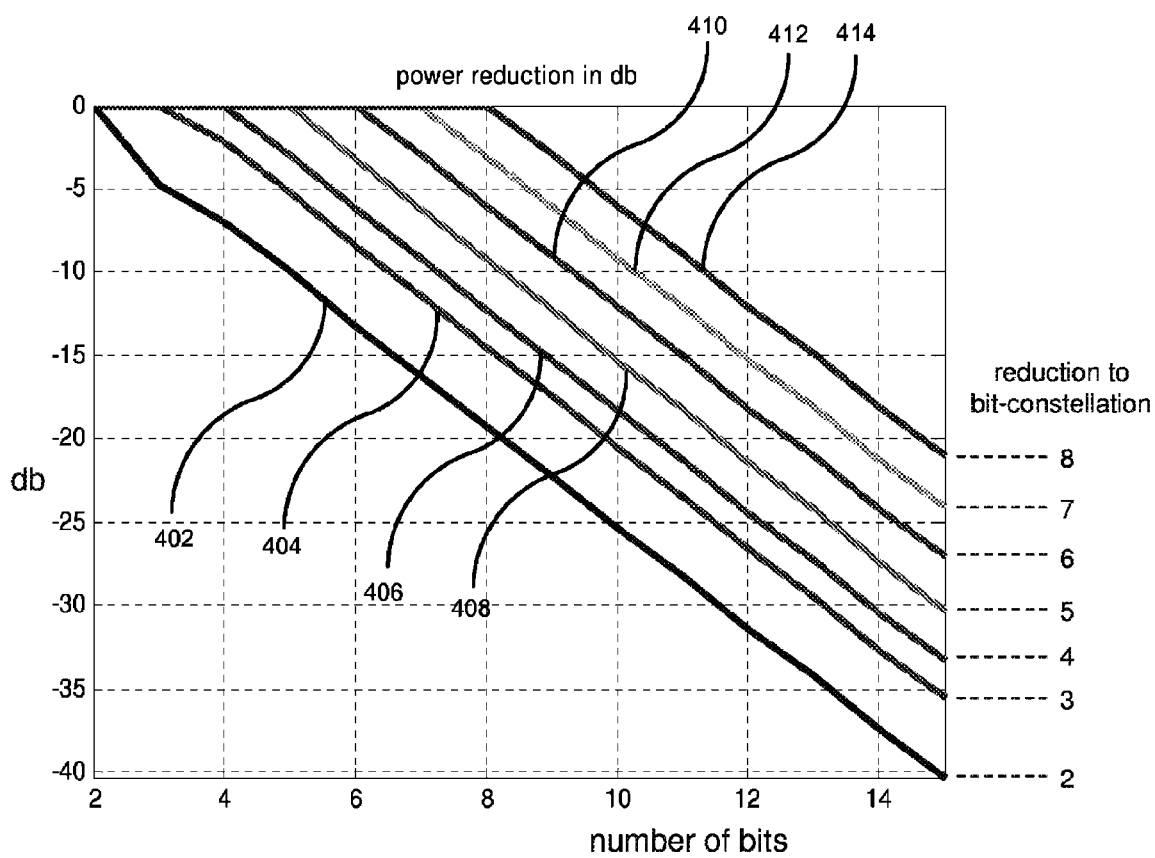
FIG. 7 shows simulation results according to an embodiment.

FIG. 7 shows results of simulations indicating the power savings which can be achieved by using the above described energy saving mode. The ordinate (X-axis) shows the number of bits corresponding to the full set of constellation points of the constellation, i.e. the number of bits transferred in the first transmission mode per symbol time and the abscissa (Y-axis) shows power savings in dB for various lines, each of the lines corresponding the number of bits transferred in the second transmission mode per symbol time. Line 402 corresponds to a use of 2 bits per symbol time in the second transmission mode. Lines 404 405, 408, 410, 412 and 414 correspond to a use of 3, 4, 5, 6, 7 and 8 bits in the second transmission mode, respectively.

The above described embodiments can be implemented in single carrier data transmission systems as well as in multi-carrier data transmission systems. An embodiment of a multi-carrier operation such as DMT or OFDM will now be described below.

Figure 8A:
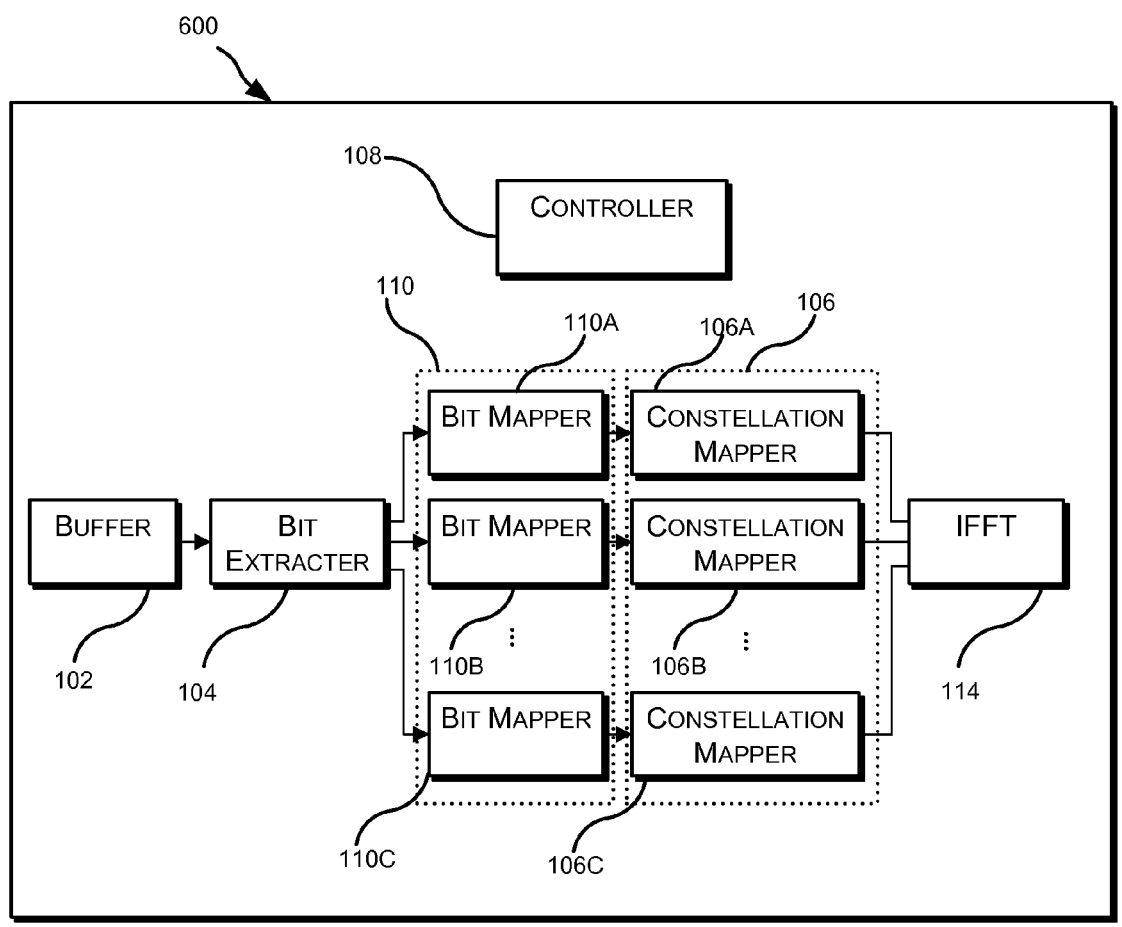
FIGS. 8a and 8b show block diagrams according to embodiments.

FIG. 8*a* shows an exemplary embodiment of a device 600 implemented for transmitting signals in a multicarrier operation. As shown in FIG. 8, the bit mapper 110 is formed by a plurality of subcarrier bit mappers 110*a*-110*c* each of the subcarrier bit mappers 110*a*-110*c* corresponding to one subcarrier of a plurality of subcarriers provided for the transmission. An input of each subcarrier bit mapper 110*a*-110*c* is coupled to a respective output of bit extracter 104. A respective output of each of the subcarrier bit mappers 110*a*-110*c* is coupled to an input of respective subcarrier constellation mappers 106*a*-106*c* forming the constellation mapper 106. According to one embodiment, the subcarrier constellation mappers 106*a*-*c* are implement as QAM constellation mappers as used for example in DMT and OFDM. Each output of the subcarrier constellation mappers 106*a*-106*c* is coupled to respective inputs of a frequency-to-time converter 114 implementing a frequency-to-time conversion for example by utilizing an IFFT (Inverse fast fourier transformation). The constellation mapper 106 formed by the subcarrier constellation mappers 106*a*-106*c* is configured to map for each of a plurality of subcarriers a set of bit sequences to a set of constellation points based on a constellation provided for each subcarrier as outlined above. Thus, each of the subcarrier constellation mappers 106*a*-106*c* has a constellation assigned to this subcarrier for example based on a bit loading determined during an initialization phase. The respective constellations may be identical for some or all of the subcarriers or may be different for some or all of the subcarriers.

In the first transmission mode, the bit extracter slices bit segments from buffer 102. Each of the bit segments is associated with a respective subcarrier. The controller 108 controls the device 600 to transfer the bit segments output from the bit extracter 104 to an input of the constellation mapper 106, i.e. to the respective inputs of the constellation subcarrier constellation mappers 106*a*-106*c*. The output of each subcarrier constellation mapper 106*a*-106*c* is then provided to frequency-to-time converter 114. In the second transmission mode, the bit extracter 104 transfers the bit segments sliced from buffer 102 for at least one subcarrier to the respective subcarrier bit mapper. The respective subcarrier bit mapper each map the received first bit segments to second bit segments having a bit sequence corresponding to one of the bit sequences of the constellation points of the subgroup. In the in the second transmission mode, for at least one subcarrier a mapping of the data bits to only a subset of the respective set of constellation points in accordance with the respective constellation is provided. It is to be noted that in the second transmission mode for the subcarriers using the subset the bit extracter slices bit segments which have a smaller length than the bit segments sliced in the first transmission mode. The bit extracter is therefore configurable to provide the variation in the segment length.

Thus, in the second transmission mode, the device 600 is configured to transfer for at least one subcarrier only second bit segments having a bit sequence corresponding to the bit sequences of the constellation points of the subgroup. In embodiments, all or at least a high percentage of the subcarriers may provide a mapping in the second transmission mode only to the subset of constellation points. Embodiments for determining which of the plurality of subcarriers provide the bit mapping as described above and which subset may be used for respective subcarriers will be described below.

It is to be noted that for all subcarriers the constellation is maintained in the second transmission mode the same as in the first transmission mode. Furthermore, according to embodiments, the operating or configuration parameter related to the constellation such as a scaling of the configuration may be maintained when switching from the first to the second transmission mode.

Figure 8B:
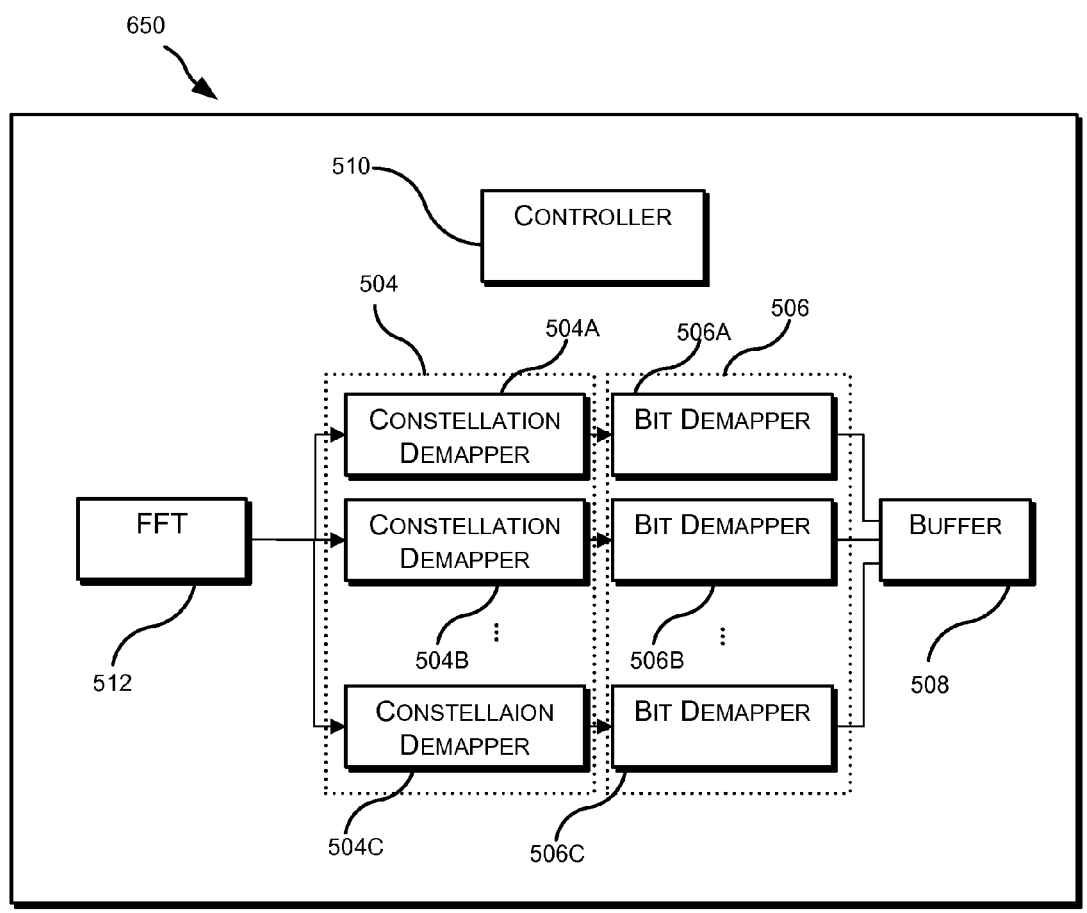

An embodiment implementing the multicarrier transmission at the receiver side is shown in FIG. 8*b*. A device 650 comprises a time-to-frequency converter 512 implementing for example a FFT (Fast Fourier Transformation) to provide the received symbols for each subcarrier. The received symbols are provided to respective inputs of subcarrier constellation demappers 504A-504C forming constellation demapper 504. Each of the subcarrier constellation demappers 504A-504C outputs a bit segment containing the bit sequence assigned to the constellation point corresponding to the received symbol. In the first transmission mode, the output of each subcarrier constellation demapper 504A-504C is provided to the buffer 508 for reassembling of the data bits. In the second transmission mode, the bit segments which have been encoded at the transmitter side by bit mapper 110 are demapped or decoded at the receiver. Thus, the output of at least one of the constellation demappers 504A-504C is provided to at least one of subcarrier bit demappers 506*a*-506*c*. In embodiments, all or at least a high percentage of the subcarriers may provide a mapping in the second transmission mode only to the subset of constellation points and require the demapping or decoding as described above. As shown in FIG. 8*b*, device 650 further has a controller 510 to control the above described operation in the first and second transmission mode.

In order to provide an error free data transmission, information are provided or determined according to embodiments to identify the exact switching point and the subset which is used in the second transmission mode. The switching point indicates when the bit segments are provided from the constellation demapper to the bit demapper and therefore no longer directly to the buffer 508. In addition, in multi-carrier systems, the receiver side is required to obtain knowledge which of the subcarrier have switched to a subset.

According to one embodiment, the information of the switching point may be determined at the receiver side as outlined in more detail below. This may be achieved without transferring any information or by transferring only a reduced amount of information regarding the switching time from the transmitter side to the receiver side. In other embodiments, the information may be transferred from the transmitter side prior to the actual switching at the transmitter side.

According to one embodiment, a predefined rule for identifying the subcarriers mapping in the second transmission mode only to the subset and determining which subset is used for these subcarriers is known to the transmitter and receiver side.

According to one embodiment, a rule may be implemented such that in the second transmission mode for each subcarrier having a number of constellation points greater than a predetermined value a same predetermined subset is used. This rule wherein for each subcarrier (frequency subchannel) the same predetermined subset of the set of constellation points is used when the number of bits (n_bit) transferred in the first data transmission mode is greater than a predetermined limit, i.e. n_bit>n_bit_red, is referred in the following as bit limitation. In embodiments, the predetermined limit has a value greater or equal to 2, i.e. n_bit_red≧2.

For example, each subcarrier having assigned a constellation with constellation points greater than 4, i.e. each subcarrier transmitting more than two bits per symbol in the first transmission mode, may use in the second transmission mode a subset containing the 4 constellation points closest to the origin. If the subset for each carrier is known, the time of switching may be determined at the receiver side. According to one embodiment, this time may be determined by monitoring the received symbols or the bit segments output by the demapper without transferring any signal for indicating the switching point from the transmitter side to the receiver side. In normal operation, the data bits transferred are stochastic data which may for example also be secured by the use of a scrambler. Then, the probability of usage is the same for all constellation points. The probability for one constellation point of a subset to be used is therefore $$p(s_i \in S(\text{n\_bit\_red})) = \frac{2^{n\_bit\_red}}{2^{n\_bit}}.$$

The term $2^{n\_bit\_red}$ represents the number of constellation points in the subset of constellation points and $2^{n\_bit}$ represents the number of constellation points in the full set of constellation points used during the first transmission mode.

By monitoring the received symbols or the bit segments output by the constellation demappers for each of the subcarriers, the probability that for all subcarrier all of the received symbols are within the subset is equal to $$p(s_i \in S(\text{n\_bit\_red})_{\text{all subcarrier}}) = \left(\frac{2^{n\_bit\_red}}{2^{n\_bit}}\right)^N.$$

For example, for an exemplary embodiment using 16 QAM constellations (n_bit=4) for 25 subcarriers and reducing the number of constellation points in the second transmission mode to 4 constellation points (n_bit_red=2), the probability that for all subcarrier all of the received symbols are within the subset is equal to $$p(s_i \in \{4 \text{ constellation points}\}_{\text{all 25 subcarrier}}) = \left(\frac{1}{4}\right)^{25} \approx 10^{-15}$$

In this example, on average every $10^{15}$ transmitted multi-carrier symbol (for example DMT symbol) is a symbol which has the transmitted symbols for all subcarriers in the subset of four constellation points. Taking for example a symbol transmission rate of 4000 symbols per second as implemented in ADSL and VDSL, the occurrence that all subcarrier transmit in the normal data operation symbols which are within the subset will be on average every 7900 years, i.e. much longer than a normal transmission session. Thus, during a normal data transmission session, the occurrence that all of the transmitted symbols are within the subset for all subcarriers can be excluded with almost 100% certainty. However, when the transmitter switches to the subset of constellations, all of the transmitted symbols for the subcarriers correspond to constellation points within the subset. By monitoring or detecting whether the received symbols for each subcarrier are within the subset, the receiver side can therefore determine the time of switching. This can be done by directly monitoring the received symbols, by monitoring the mapping in the constellation mapper or by monitoring the bit sequences of the bit segments output from each of the subcarrier constellation demappers.

Similar to the determining of the switching from the first to the second transmission mode, the receiver can determine the switching from the second to the first transmission mode by monitoring when the received symbols represent constellation points which are outside of the subset for all subcarriers.

According to other embodiments, other predefined rules may be used for determining the subgroup for respective subcarriers. According to one embodiment, the number of constellation points of the subset is determined by a predetermined quotient. Since the number N of constellation points corresponds to the number n_bit of bits that can be transferred by each symbol by $N=2^{n\_bit}$, according to this rule a subset is used for each subcarrier having a number of constellation points determined by a difference value $\Delta n$ representing the number of bits which are transferred less in the second transmission mode. In other words, the bits n_bit_red provided per symbol in the second data transmission mode is determined by n_bit_red=n_bit−$\Delta n$ corresponding to a number N_red of constellation points in the subset of N_red=$2^{n\_bit\_red}$. This rule will therefore be referred to as bit-reduction rule.

According to one embodiment implementing the second data transmission mode as energy saving mode, if the reduction by the predetermined number of bits (or predetermined quotient) determines for a subcarrier a subset of only 2 constellation points (1 bit per symbol), the subcarrier will be assigned to 4 constellation points (2 bits per symbol) since the average power for transmitting symbols with the two constellation points closest to the origin is the same as for transmitting with the four constellation points closest to the origin. In other words, when n_bit_red=1 according to this bit-reduction rule a number for n_bit_red=2 is selected. Furthermore, if the reduction of the bits transmitted each symbol by a predetermined value would result in zero or a negative value, the subcarrier will be selected to be in a quiet mode in the second transmission mode, i.e. no power will be transmitted on this subcarrier in the second transmission mode. In other words, for n_bit_red<0 a value of n_bit_red=0 will be selected. The above predetermined rule allows to form the spectral power density of the second transmission mode similar to the spectral power density of the first transmission mode.

It is to be noted that similar to the bit-limitation rule, with the bit-reduction rule being known to both the transmitter and receiver the receiver can determine the time of switching between the two transmission modes since the subcarrier using a subset in the second transmission mode and the respective subsets used for each subcarrier can be calculated by the receiver when the bit loading for each subcarrier is known.

According to one embodiment, the predetermined rule is known to the transmitter side and the receiver side for example by having the rule provided in a communication standard or by transferring the rule during an initialization. Then for the above described embodiments, after determining during the initialization the bit loading for each subcarrier each of the devices at the transmitter and receiver side can determine the respective subcarriers which would undergo a transformation in the mapping to the subset and the respective subset which would be used during the second transmission mode for each of these subcarriers. Furthermore, during the initialization, it could be determined what the average probability of making an erroneously determined switching at the receiver side would be. If this value would be not acceptable, for example if a predetermined threshold is exceeded, the system, i.e. one or both of the devices may determine a number greater than one of consecutively transmitted symbols which are used for making the decision of a switching in the second transmission mode thereby decreasing this probability under the predetermined threshold value.

Figure 9:
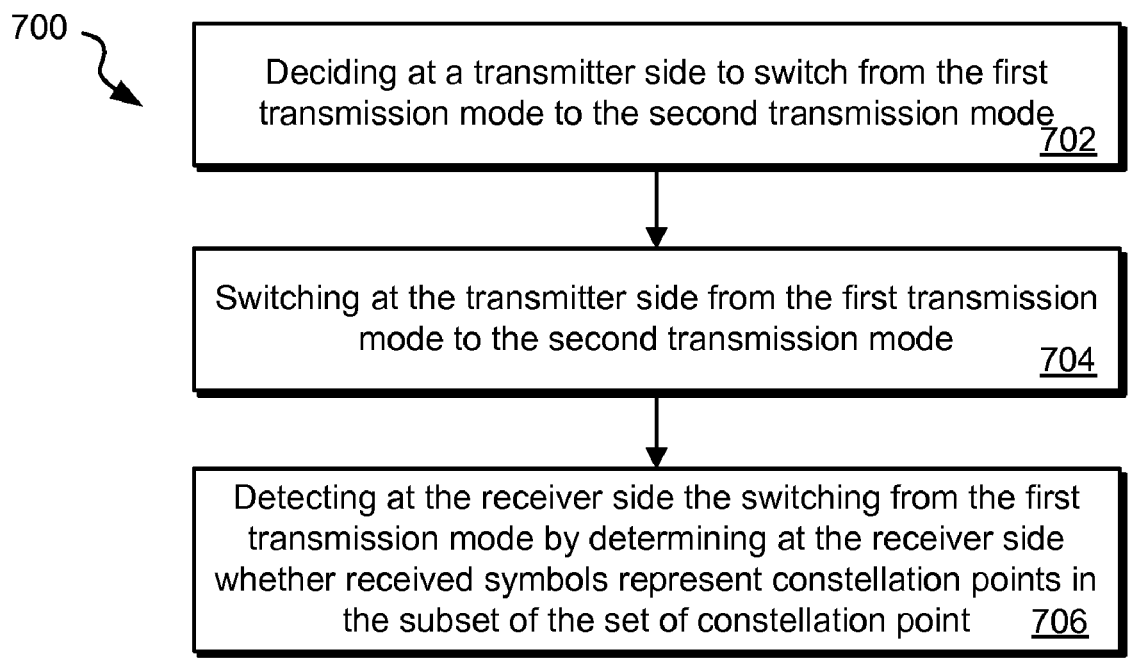
FIG. 9 shows a flow chart diagram according to an embodiment.

An exemplary flow chart 700 illustrating an embodiment of switching from the first to the second transmission mode is shown in FIG. 9. At 702 it is decided at the transmitter side to switch from the first transmission mode to the second transmission mode. At 704, the transmission mode is switched at the transmitter side from the first to the second transmission mode. At 706, the switching from the first to the second transmission mode is detecting at a receiver side by determining whether received symbols represent constellation points in the subset of the set of constellation points. The method described above may require no additional transmission of information from the transmitter to the receiver side in order to signal the time of switching to the receiver side as explained above with respect to a multicarrier system. It is to be noted that the above flow chart can be implemented in a single-carrier transmission and a multi-carrier transmission.

In a single carrier transmission, the data may be buffered for some time in order to obtain sufficient certainty that a switching has occurred by monitoring other symbols received at later times. After the buffering, the data bits are then transferred either directly to a reassembling entity or via the bit demapper to the reassembling entity. As noted above, the determining whether received symbols represent constellation points within the subset can be performed by directly monitoring the received symbols or by monitoring the bit sequences of the bit segments output by the constellation demapper. It is further to be noted that the buffering of data may also increase the certainty of errorfree detection of the time of switching in a multi-carrier system. Furthermore, many communication systems, for example communication systems implementing a retransmission provide buffering of the data for some time so that no substantial modifications are required for implementing. Furthermore, it is to be noted that in systems implementing retransmission, a check sum test or other check for corrupted data packets is performed at the receiver side.

Thus, although the probability that a switching time is erroneously detected at the receiver is negligible, even in the case that the receiver erroneously determines a switching from the first to the second transmission mode and starts to provide the data segments to the bit demapper, the check for corrupted data would result in detecting that the data is corrupted and a storing of the "corrupted" data bits. If the received data bits are continuously detected to be corrupted, a test may be performed by providing the reverse of the demapping scheme to the data bits identified as corrupted, i.e. reversing the demapping provided by the bit demapper, and then determine whether these data bits would still be determined in a corruption check as corrupted. If with the reversing of the bit demapping the data bits would be determined to be not corrupted, the device will determine an erroneous detection of the data transmission mode switching and the controller would be informed thereof.

Figure 11:
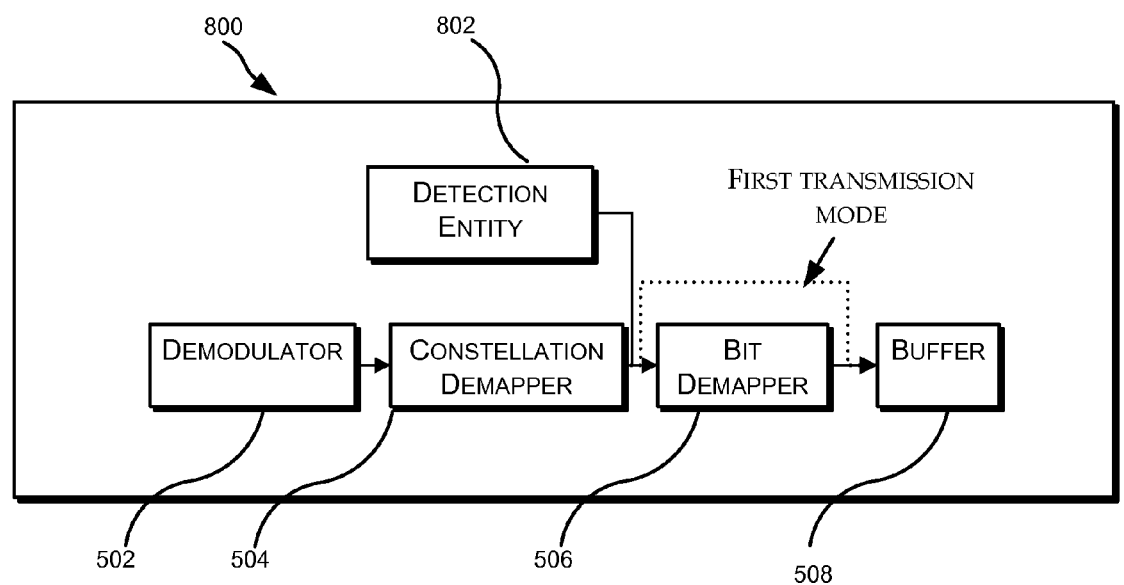
FIG. 11 shows a block diagram according to an embodiment.

An embodiment of a device implementing the detection of the data transmission mode switching at the receiver side is shown in FIG. 11. FIG. 11 shows a device 800 comprising a demodulator 502, a constellation demapper 504, a bit demapper 506 and a buffer 508. The structure and operation of demodulator 502, constellation demapper 504, bit demapper 506 and buffer 508 has been described with respect to FIG. 5b and will therefore not be repeated here. In addition, the device 800 comprises a detection entity 802 coupled to the output of the constellation demapper 504 to monitor the bit sequences of the bit segments output by constellation demapper 504 to determined whether the received symbol represents a constellation point which is located within the subset used during the second data transmission mode. As outlined above already, instead of monitoring the bit sequences at the output of the constellation demapper 504, the detection entity 802 may in other embodiments monitor the symbols transferred to the constellation demapper 504 or may monitor the mapping within the constellation demapper 504 in order to determine whether the received symbol represents a constellation point which is located within the subset used during the second data transmission mode. According to one embodiment of a multi-carrier implementation, an input of the constellation demapper 504 receives for each subcarrier of first subcarriers a symbol transmitted from a remote device as is explained with respect to FIG. 8b. The constellation demapper 504 is configured to map for each first subcarrier the transmitted symbol to first bit segments based on a constellation provided for each first subcarrier. The detection entity is configured to provide for each first subcarrier information whether the symbol transmitted on this subcarrier represents a constellation point within a subset of the respective set of constellation points for the respective subcarrier. Based on this information, the time of switching of the data transmission mode is detected and based on the detection the device 800 is controlled to switch the transfer of the bit segments output by constellation demapper 504 from a direct transfer to buffer 508 in the first data transmission mode to a transfer to the bit demapper 506 in the second data transmission mode.

Figure 10A:
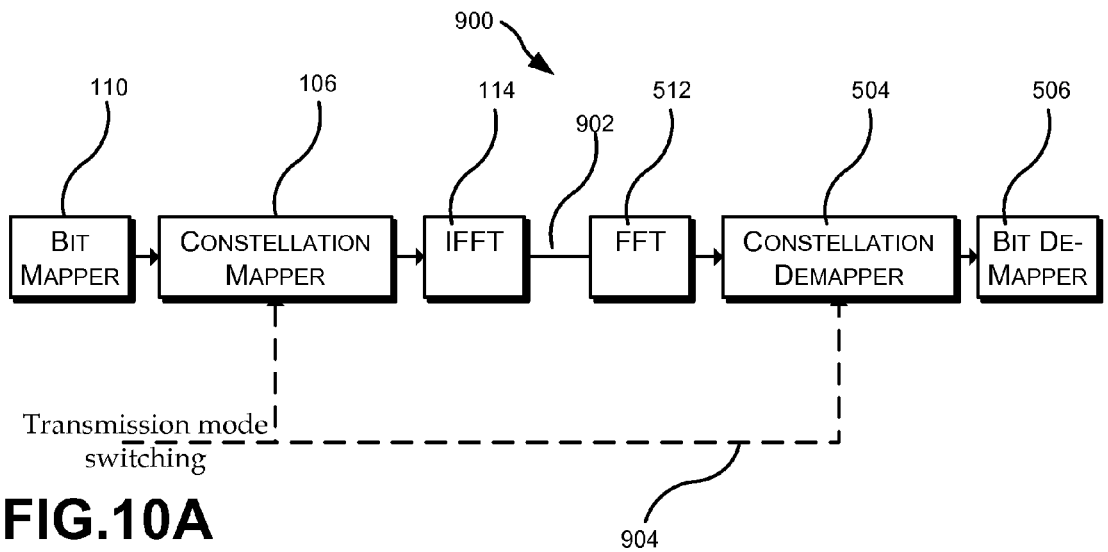
FIGS. 10a and 10b show block diagrams according to embodiments.
Figure 10B:
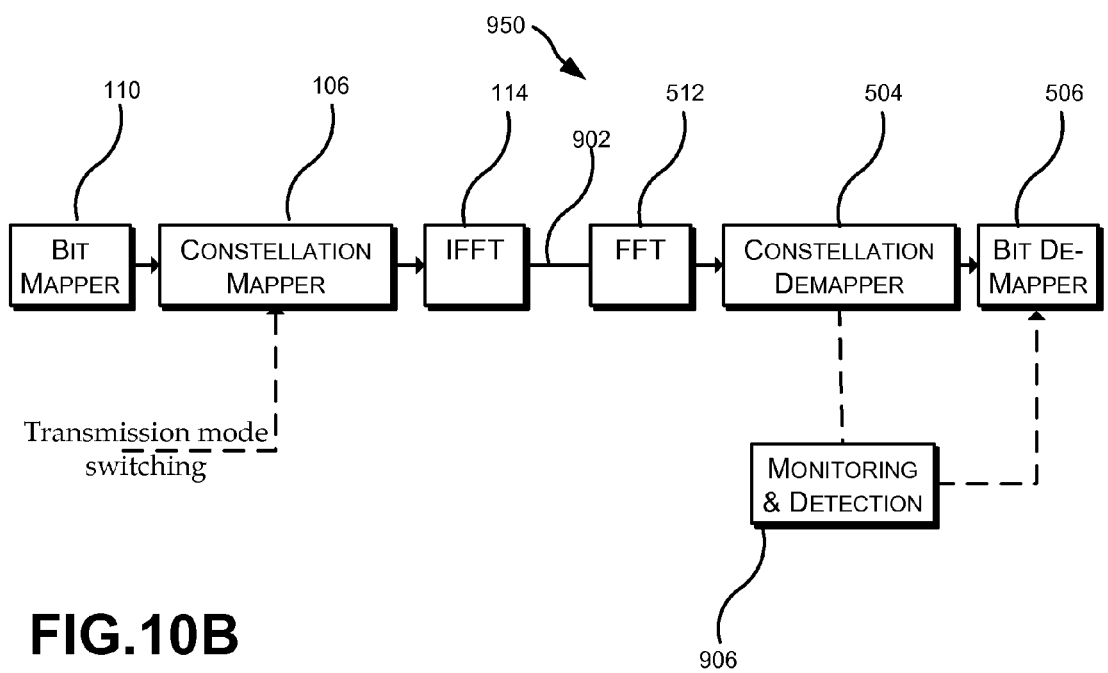

FIGS. 10a and 10b show respective block diagrams of embodiments of a data communication system implementing a signaling of the time of switching from the transmitter to the receiver and a data communication system implementing a detection of the data transmission mode switching without requiring a signaling of the time of switching from the receiver to the transmitter.

FIG. 10a shows a multi-carrier data communication system 900 having at the transmitter side a bit mapper 110, a constellation mapper 106 and a frequency-to-time converter 114. At the receiver side, the communication system comprises a time-to-frequency converter 512, a constellation demapper 504 and a bit demapper 506. Transmitter side and receiver side are coupled by a communication channel 902 which may for example be a twisted pair wire or a wireless communication channel. In the system 900, a signal indicating a change of the transmission mode is provided to bit mapper 110 and via a channel 904 to bit demapper 506 in order to indicate that the transmission mode has changed and mapping and demapping according to the mapping scheme provided respectively in bit mapper 110 and bit demapper 506 has to be performed. Channel 904 may for example be implemented by using a dedicated subcarrier for transmitting the signaling information.

In FIG. 10b, a multi-carrier data communication system 950 has at the transmitter side the bit mapper 110, the constellation mapper 106 and the frequency-to-time converter 114. At the receiver side, the communication system has the time-to-frequency converter 512, the constellation demapper 504 and the bit demapper 506. Transmitter side and receiver side are coupled by a communication channel 902 which may for example be a twisted pair wire or a wireless communication channel. In the system 950, a signal indicating a change of the transmission mode is provided only to bit mapper 110. At the receiver side, a monitoring and detection block 906 is provided which may for example be implemented by detection entity 802 shown in FIG. 11.

The monitoring and detection block 906 monitors the received symbols and detects a change between the transmission modes as outlined above.

Figure 12:
FIG. 12 shows a time diagram according to an embodiment.
Figure 12:
Figure 12:
Figure 12:
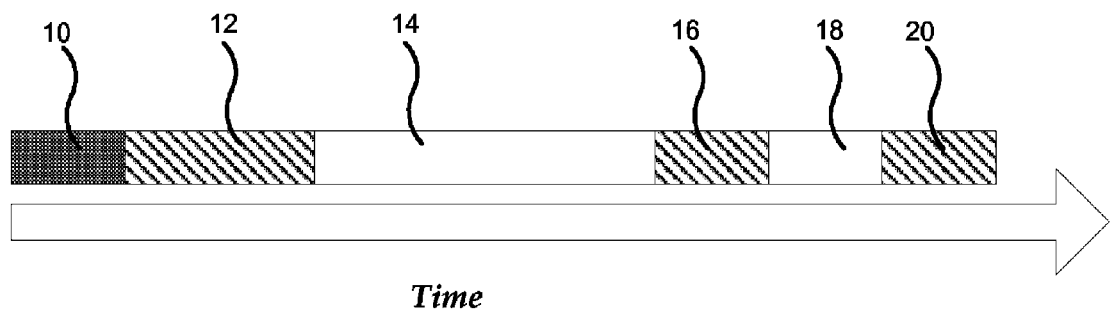

An exemplary operation during a user session will now be described with respect to FIG. 12. After initialization of the system at 10, the system enters showtime where the transmission of the user data begins. In 12 a first data transmission is provided for transmitting the user data where the full transmission capacity is used for example when the user watches a movie over internet. Then at 14 the system transmits data in the second transmission mode in order to save energy. This may be for example because the user stopped to watch the movie and started to chat in a chatroom requiring only a very low data rate requirement. In 16, the user starts to play a video game over internet requiring a high data rate and the system is again in the first data transmission mode. In 18, the user stopped the video game and started to play chess over internet with a remote chess player requiring only a low data rate and the system therefore transfers data in the second data transmission mode to save energy. Then at 20 the user starts to watch TV over internet requiring the high data rate delivered by the first data rate. In embodiments, switching may be based on a required user data load which may be a minimal user data rate which is momentary required for fulfilling the needs of the user. It is to be understood that the above is only one of many examples of multiple switchings between the first and second data transmission mode in order to save energy or to obtain a more robust transmission.

Figure 13A:
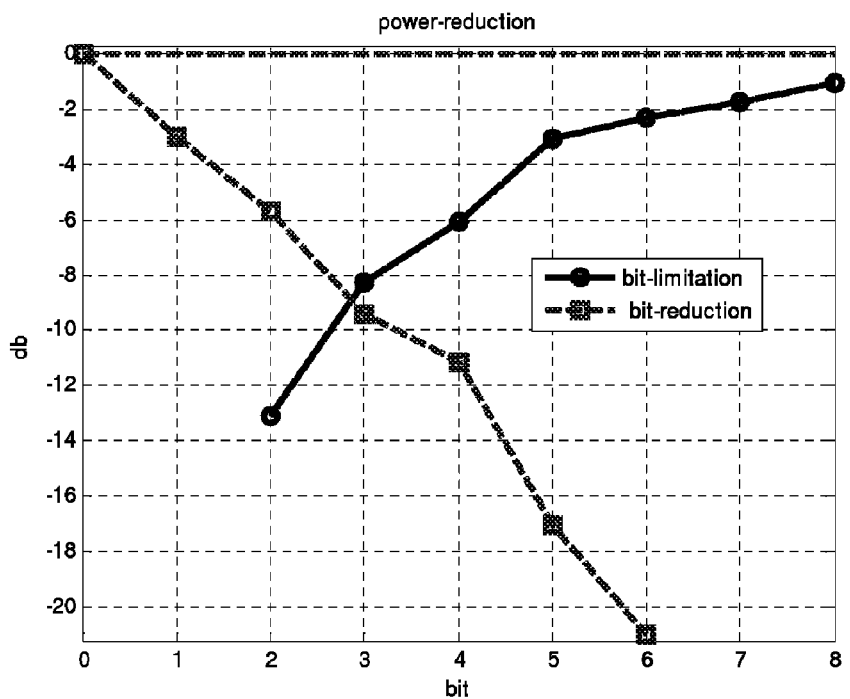
FIGS. 13a-c show simulation results according to an embodiment.
Figure 13B:
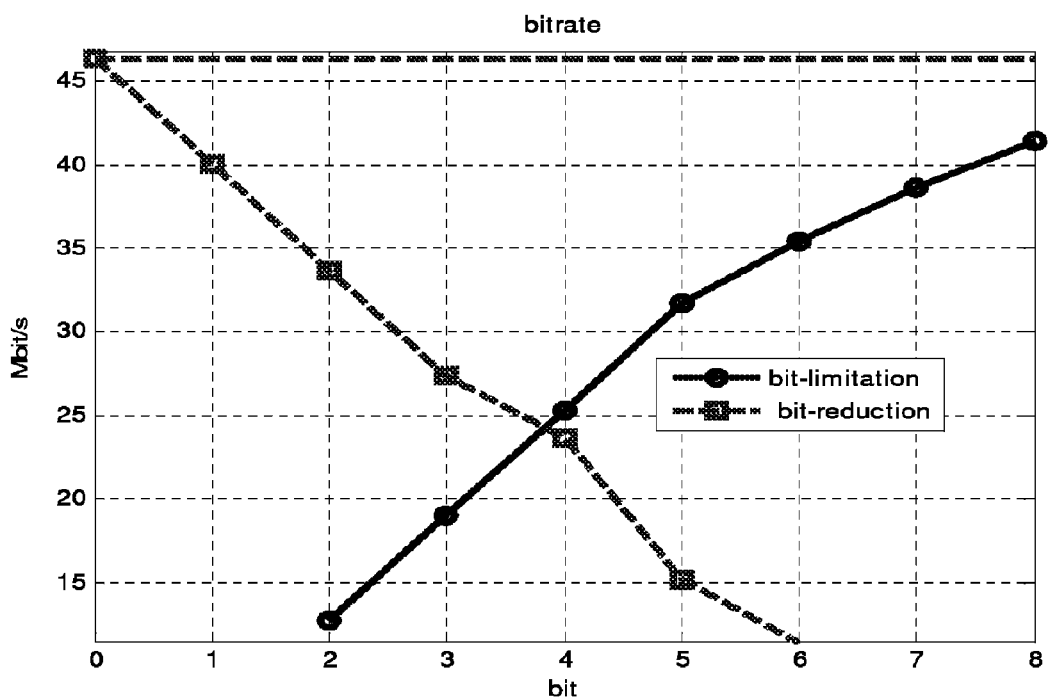
Figure 13C:
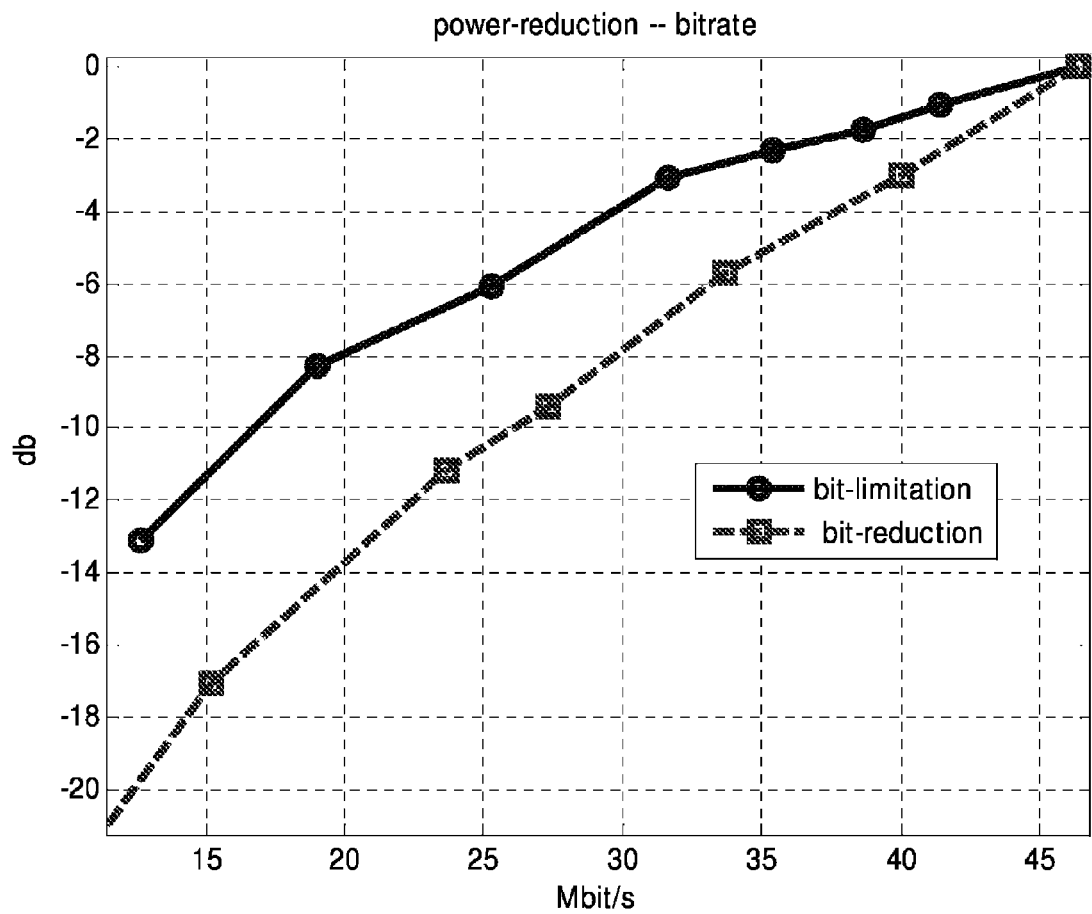

FIGS. 13a-13c show results of a simulation for an embodiment of a VDSL transmission. The simulation refers to a VDSL system in downstream direction, i.e. from a Central Office to subscribers. The transmission signal has been divided in two frequency bands which are defined in the VDSL standard. The spectral power density for the frequency bands has been assumed to −60 dBm/Hz. The receive signal has been simulated to be distorted by white alien noise and by the crosstalk from 9 other VDSL lines within one cable bundle. The VDSL line is assumed to be a AWG-26 line with a length of 400 meters. In this simulation with the full transmission capacity in the first transmission mode a bit rate of 46 Mbit/s is achieved. The second transmission mode is assumed to be an energy saving transmission mode wherein the constellation points of the subset are selected to be the constellation points closest to the origin of the constellation diagram. By reducing the average power due to using the subset, the bit rate is reduced. As can be seen, the performance, i.e. the transmission rate in the second data transmission mode as a function of the reduced power depends on the rule selected for switching. Although other rules may be used, the simulation has examined effects of the above described bit-limitation and the bit-reduction rule.

FIG. 13a represents on the abscissa (Y-axis) the reduction of the transmission power in dB for the bit-limitation and the bit-reduction rule. It is to be noted that the ordinate (X-axis) of FIG. 13a represents for the bit-limitation rule the number $n\_bit\_red$ of bits per symbol in the second transmission mode while for the bit-reduction rule the ordinate represents the difference of the bits per symbol between the first and second transmission rule, i.e. $\Delta n$.

FIG. 13b shows the data transmission rate obtained in the second transmission rate. Again, the ordinate (X-axis) represents for the bit-limitation rule the number $n\_bit\_red$ of bits per symbol in the second transmission mode while for the bit-reduction rule the ordinate represents the difference of the bits per symbol between the first and second transmission rule, i.e. $\Delta n$.

The diagrams of FIG. 13a and FIG. 13b can be combined to show in one diagram the performance i.e. the reduced power in dB versus the data rate in the second transmission mode.

It can be observed that the bit-reduction rule achieves for a same data rate a higher reduction in power than the bit-limitation rule. This can be explained due to a better matching of the bit-reduction rule to the power spectrum density of the system reflected by the power spectrum density varying over the plurality of subcarriers.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. Furthermore the terms "coupled" or "connected" may be interpreted in a broad sense not only covering direct but also indirect coupling.

The accompanying drawings that form a part hereof show by way of illustration, and not of limitation, specific embodiments in which the subject matter may be practiced.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of communicating data comprising:
providing a constellation, the constellation assigning a set of bit sequences to a set of constellation points;
transferring data in a first transmission mode, the transferring data in the first transmission mode comprising:
providing transmission symbols by mapping data bits to constellation points of the set of constellation points in accordance with the constellation,
modulating a transmission signal based on the transmission symbols;
transferring data in a second transmission mode, the transferring data in the second transmission mode comprising:
providing the transmission symbols by mapping data bits only to a subset of the set of constellation points in accordance with the constellation, and
modulating a transmission signal based on the transmission symbols;
switching from the first to the second transmission mode; and
detecting at a receiver the switching from the first to the second transmission mode, the detecting at the receiver side comprising a determining whether received symbols represent constellation points in the subset of the set of constellation points.

2. The method according to claim 1, wherein mapping the data bits only to the subset of the set of constellation points comprises transferring to an input of a constellation mapper segments of data bits having a only bit sequences representing constellation points within the subset.

3. The method according to claim 2, wherein mapping the data bits to only the subset of the set of constellation points comprises:
providing a bit mapping scheme, the bit mapping scheme assigning a set of first bit sequences to a set of second bit sequences, wherein a length of the first bit sequences is smaller than a length of the second bit sequences;
mapping in accordance with the bit mapping scheme the data bits to second bits,
mapping in accordance with the constellation the second bits to constellation points.

4. The method according to claim 1, further comprising:
providing a plurality of constellations, each of the plurality of constellations being assigned to a subcarrier of a plurality of subcarriers and each of the plurality of constellations comprising a set of constellation points, the method further comprising:
in the first transmission mode, mapping for each subcarrier the data bits to the respective set of constellation points in accordance with the respective constellation;
in the second transmission mode, mapping for at least one subcarrier the data bits to only a subset of the respective set of constellation points in accordance with the respective constellation.

5. The method according to claim 4, wherein mapping for at least one subcarrier the data bits to only the subset of constellation points comprises:
slicing the data bits into a plurality of segments of data bits, each of the segments of data bits being associated with a subcarrier of the plurality of subcarriers;
for at least one subcarrier of the plurality of subcarriers, providing a bit mapping scheme, the bit mapping scheme assigning a set of first bit sequences to a set of second bit sequences, wherein a length of the first bit sequence is smaller than a length of the second bit sequence;
for at least one subcarrier of the plurality of subcarriers, mapping in accordance with the bit mapping scheme the data bits to second bits,
for at least one subcarrier of the plurality of subcarriers, mapping in accordance with the constellation the second bits to constellation points.

6. The method according to claim 4, further comprising:
scaling a constellation in the first transmission mode for each subcarrier by a scaling factor, and
maintaining the scaling factor for each subcarrier in the second transmission mode.

7. The method according to claim 1, further comprising:
determining that the transmission mode is to be changed to an energy saving transmission mode;
selecting the subset of the set of constellation points to lower the average transmission power in the second transmission mode compared to the first transmission mode; and
changing from the first to the second transmission mode based on the determining that the transmission mode is to be changed to the energy saving mode.

8. The method according to claim 4, further comprising:
determining for at least one subcarrier the subset of the set of constellation points, the determining for at least one subcarrier the subset comprising:
determining for each subcarrier a first value representing the number of constellation points in the set of constellation points,
determining for each subcarrier whether the first value is greater than an second value, and
selecting a predetermined subset for each subcarrier being determined to have a first value greater than the second value; and
maintaining a respective constellation for subcarriers being determined to have a first value equal or smaller than the second value.

9. The method according to claim 4, further comprising:
determining for at least one subcarrier the subset of the set of constellation points, the determining for at least one subcarrier the subset of constellation points comprising:
selecting a reduction value,
subtracting for each subcarrier the reduction value from a first value representing a number of constellation points in the constellation to provide a subtraction result indicating a reduced number of constellation points,
for each subcarrier of the plurality of subcarriers having a first value equal or smaller than the reduction value, transmitting no power on the subcarrier,
for each subcarrier of the plurality of subcarriers having a subtraction result indicating 2 constellation points, selecting a constellation having 4 constellation points, and
for each other subcarrier of the plurality of subcarriers, selecting a constellation having a number of constellation points equal to the reduced number of constellation points indicated by the subtraction result.

10. A device comprising:
a data input to provide segments of data bits to be transmitted;
a constellation mapper, the constellation mapper mapping a set of bit sequences to a set of constellation points in accordance with a constellation;
wherein the device is configured to map in a first transmission mode the segments of the data bits to the set of constellation points in accordance with the constellation,
wherein the device is configured to map in a second transmission mode the segments of data bits only to constellation points of a subset of the set of constellation points in accordance with the constellation, and
wherein the device is configured to scale a constellation in the first transmission mode for each subcarrier by a scaling factor and to maintain the scaling factor for each subcarrier in the second transmission mode.

11. The device according to claim 10, further comprising:
a data buffer to provide data to be transmitted;
a bit extracter coupled to the data buffer to extract the segments of data bits from the data buffer,
wherein the bit extracter is configurable to extract in the first transmission mode first segments of data bits having a first length and in the second transmission mode second segments of data bits having a second length smaller than the first length.

12. The device according to claim 10 further comprising:
a bit mapper configured to be operable during the second transmission mode, the bit mapper comprising:
an input to receive in the second transmission mode second segments of data bits,
a mapping entity to map the second segments of data bits to first segments of data bits according to a mapping scheme, wherein a length of the second segments is smaller than a length of the first segments, and
an output to output the first segments of data bits to an input of the constellation mapper.

13. The device according to claim 11,
wherein the constellation mapper is configured to map for each of a plurality of subcarriers a set of bit sequences to a set of constellation points based on a constellation provided for each subcarrier, each respective constellation comprising a set of constellation points,
wherein the device is configured to transfer in the first transmission mode first segments of data output from the bit extracter to an input of the constellation mapper, and
wherein the device is configured to transfer in the second transmission mode for at least one subcarrier of the plurality of subcarrier second segments of data bits to the bit mapper.

14. The device according to claim 10, wherein the device is operable to repeatedly switch from the first transmission mode to the second transmission mode during a user data transmission session.

15. A device comprising:
an input to receive for each subcarrier of first subcarriers a symbol transmitted from a remote device;
a constellation demapper to map for each first subcarrier the transmitted symbol to first bit segments based on a constellation provided for each first subcarrier, each constellation comprising a set of constellation points;
an entity to provide for each first subcarrier information whether the symbol transmitted on this subcarrier represents a constellation point within a subset of the respective set of constellation points for the respective subcarrier;
wherein the device is configured to determine a change from a first transmission mode to a second transmission mode based on the information;
a transmit path, the transmit path comprising:
a data buffer to provide data to be transmitted;
a bit extracter coupled to the data buffer to extract segments of data bits from the data buffer;
a constellation mapper, the constellation mapper mapping a set of bit sequences to a set of constellation points in accordance with a constellation;
wherein the device is configured to map in the first transmission mode segments of the data bits to constellation points in accordance with the constellation, and
wherein the device is configured to map in the second transmission mode segments of data bits only to constellation points of the subset of the set of constellation points in accordance with the constellation.

16. The device according to claim 15, wherein the device further comprises a receive path, the receive path comprising:
a constellation demapper;
a bit demapper, the bit demapper being configured to be operable during the second transmission mode, the bit demapper comprising:
an input to receive third bit segments from the constellation demapper,
a mapping entity to map the third bit segments to fourth bit segments according to a bit mapping scheme, wherein a length of the third bit segments is greater than a length of the fourth bit segments, and
an output to output the fourth bit segments.

17. A system comprising:
a first device, the first device comprising:
an input to provide segments of data bits;
a constellation mapper, the constellation mapper mapping a set of bit sequences to a set of constellation points in accordance with a constellation;
wherein the first device is configured to map in a first transmission mode segments of the data bits in accordance with the constellation to one or more constellation points and to modulate a transmission signal based on the one or more constellation points;
wherein the first device is configured to map in a second transmission mode segments of data bits only to constellation points of a subset of the set of one or more constellation points and to modulate the transmission signal based on the one or more constellation points of the subset, and
wherein the first device is further configured to scale the constellation in the first transmission mode for each subcarrier by a first scaling factor and to maintain the first scaling factor for each subcarrier in the second transmission mode;
a second device, the second device comprising:
an input to receive a symbol transmitted from the first device;
a constellation demapper to map the transmitted symbol to first bit segments based on the constellation;
an entity to provide information whether the symbol transmitted is within the subset of constellation points; and
wherein the second device is configured to determine the change from the first transmission mode to the second transmission mode based on the information, and wherein the second device is further configured to scale the constellation in the first transmission mode for each subcarrier by a second scaling factor and to maintain the second scaling factor for each subcarrier in the second transmission mode.

18. The system according to claim 17, wherein the system is operable to repeatedly change from the first transmission mode to the second transmission mode during a user data transmission session.

19. The system according to claim 17,
wherein the system is a multicarrier system,
wherein the constellation mapper is configured to map for each of a plurality of subcarriers first bit segments to constellation points based on a constellation provided for each subcarrier, each respective constellation comprising a set of constellation points, and
wherein the second device further comprises:
a bit demapper comprising:
an input to receive third bit segments from the constellation demapper
a mapping entity to map the third bit segments to fourth bit segments according to a bit mapping scheme,
wherein a length of the third bit segments is greater than a length of the fourth bit segments, and
an output to output the fourth bit segments,
wherein the second device is configured to selectively couple the constellation demapper to the bit demapper based on the information provided by the entity.

* * * * *